March 3, 1936. C. E. DRUMHELLER 2,033,095
MECHANISM FOR AND METHOD OF MAKING EXPANSIBLE PLAIN
KNITTED FABRIC CONTAINING RUBBER-LIKE STRANDS
Filed Jan. 19, 1934 10 Sheets-Sheet 1

Inventor:
Charles E. Drumheller,
by Emery, Booth, Varney and Townsend
Attys

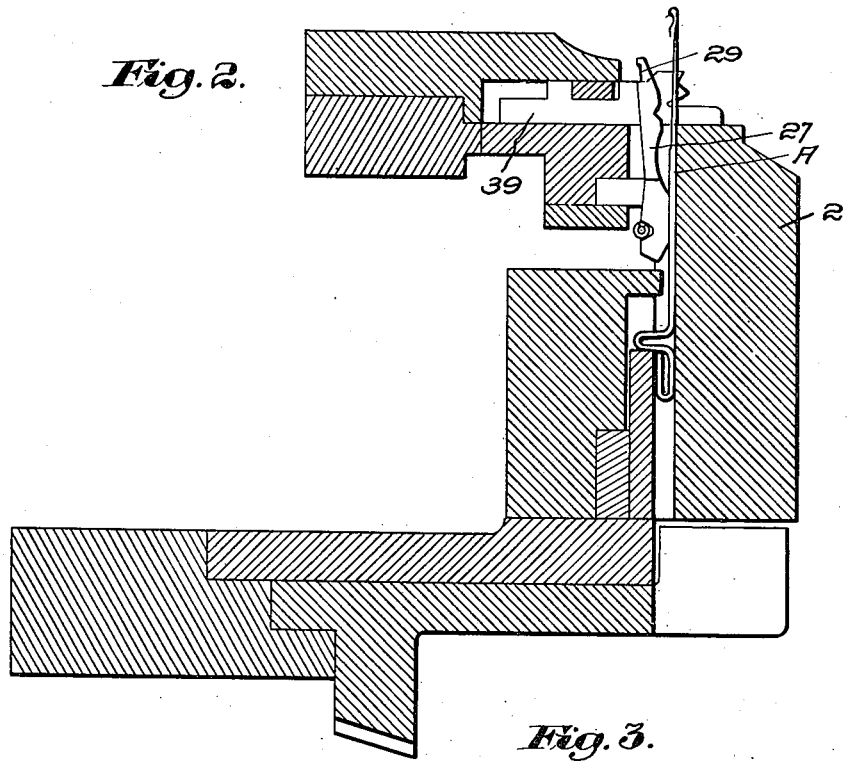
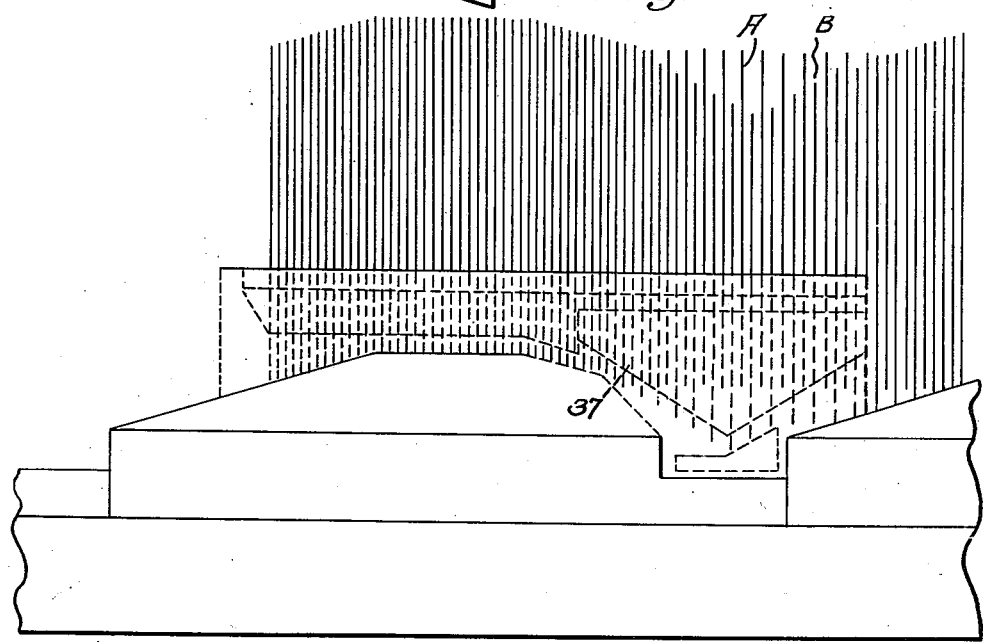

March 3, 1936.　　　C. E. DRUMHELLER　　　2,033,095
MECHANISM FOR AND METHOD OF MAKING EXPANSIBLE PLAIN
KNITTED FABRIC CONTAINING RUBBER-LIKE STRANDS
Filed Jan. 19, 1934　　　10 Sheets-Sheet 3

Inventor:
Charles E. Drumheller,
by Emery, Booth, Vaughan Townsend Attys.

March 3, 1936. C. E. DRUMHELLER 2,033,095
MECHANISM FOR AND METHOD OF MAKING EXPANSIBLE PLAIN
KNITTED FABRIC CONTAINING RUBBER-LIKE STRANDS
Filed Jan. 19, 1934    10 Sheets-Sheet 4
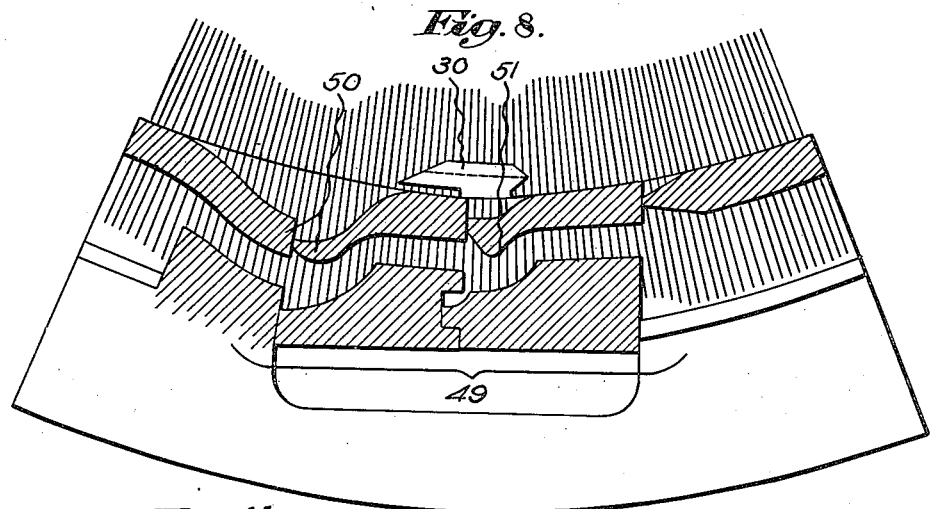
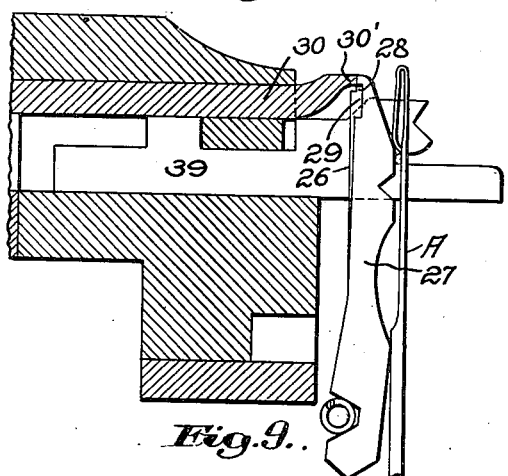
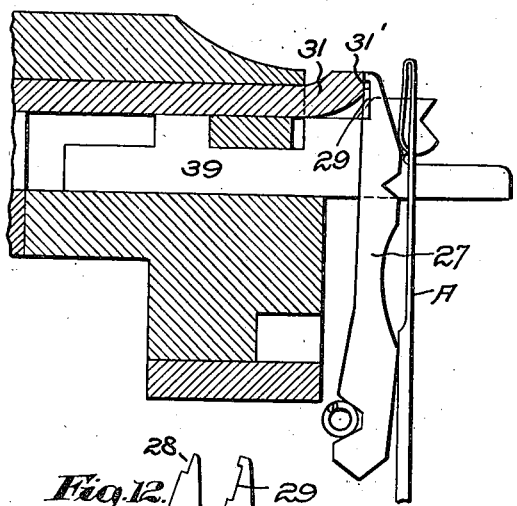
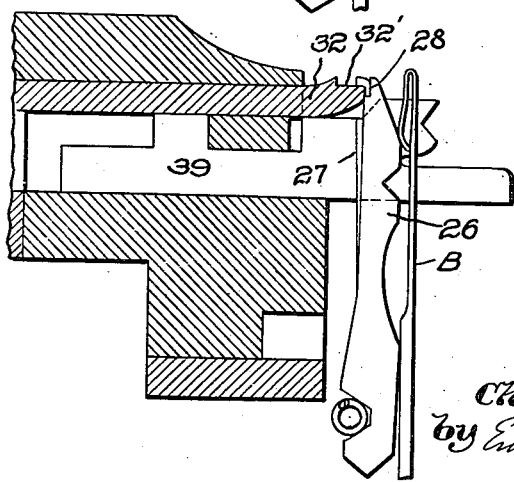
Inventor:
Charles E. Drumheller,
by Emery, Booth, Varney and Townsend
Attys Inventor:
Charles E. Drumheller March 3, 1936.    C. E. DRUMHELLER    2,033,095
MECHANISM FOR AND METHOD OF MAKING EXPANSIBLE PLAIN
KNITTED FABRIC CONTAINING RUBBER-LIKE STRANDS
Filed Jan. 19, 1934    10 Sheets-Sheet 6
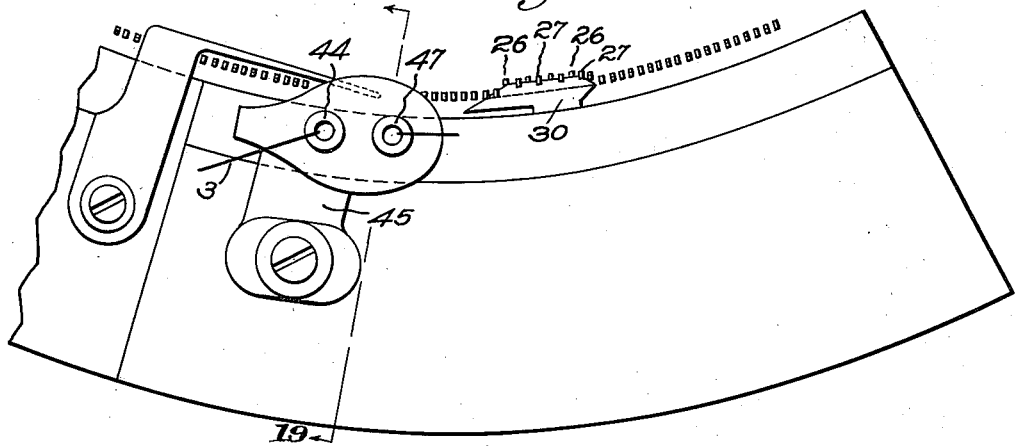
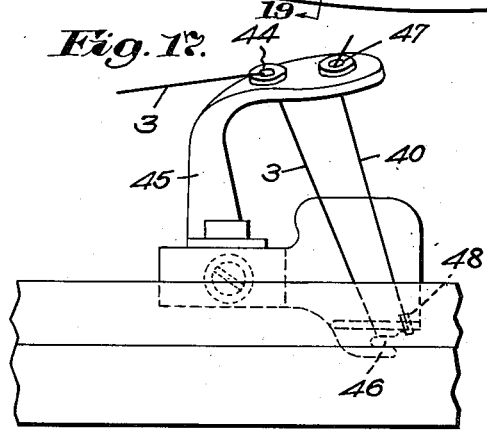
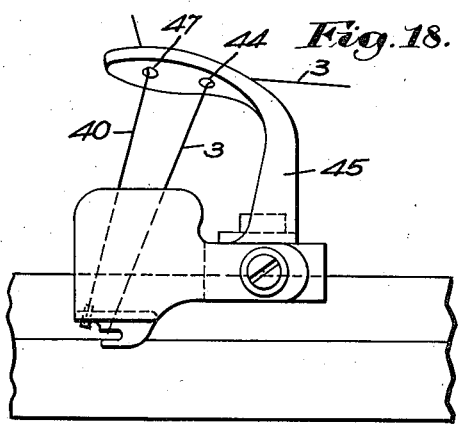
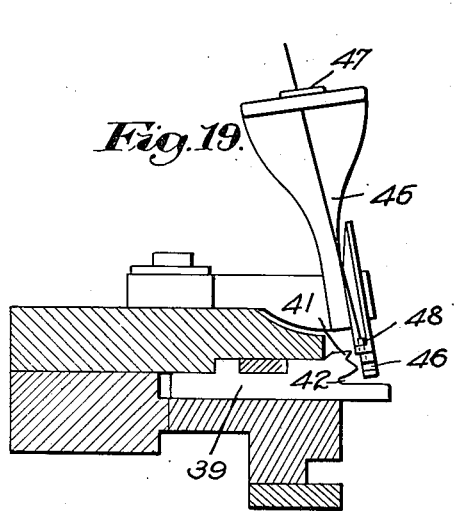
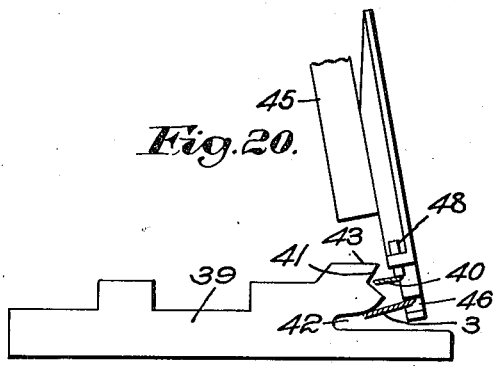
Inventor:
Charles E. Drumheller
Attys.

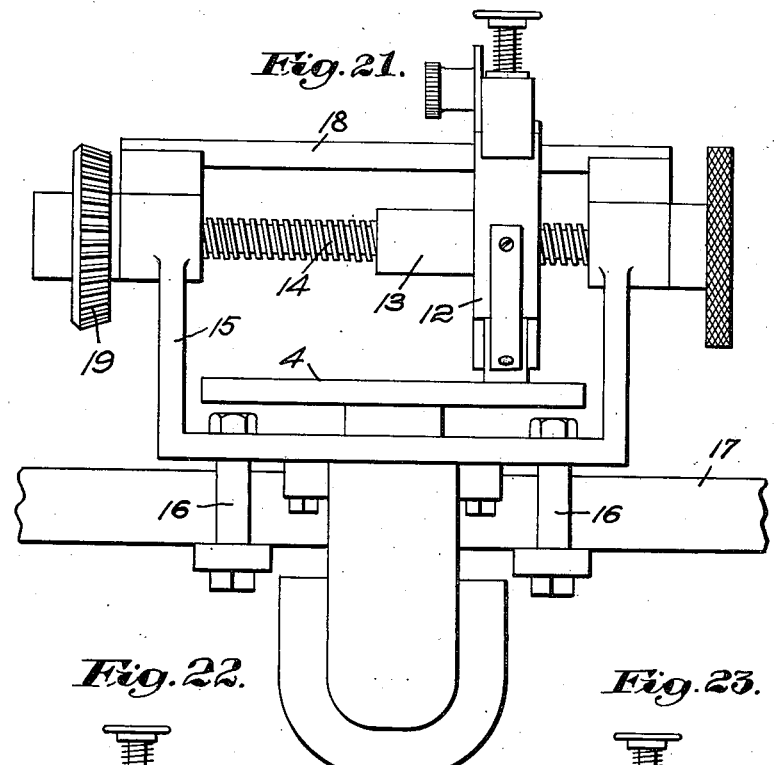
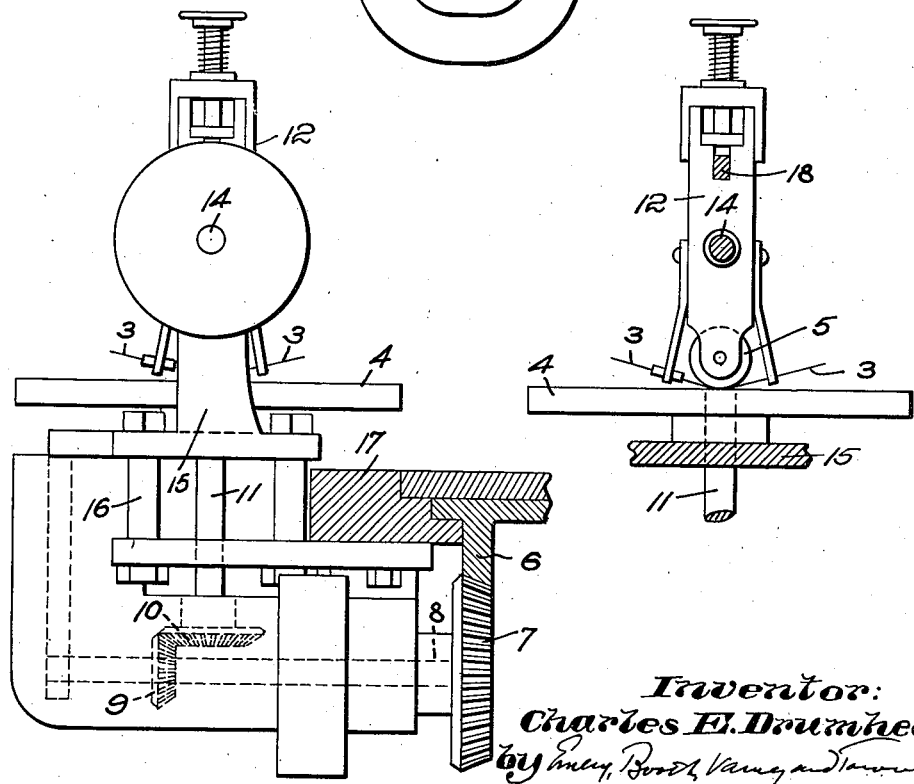

Inventor:
Charles E. Drumheller

Fig. 26.
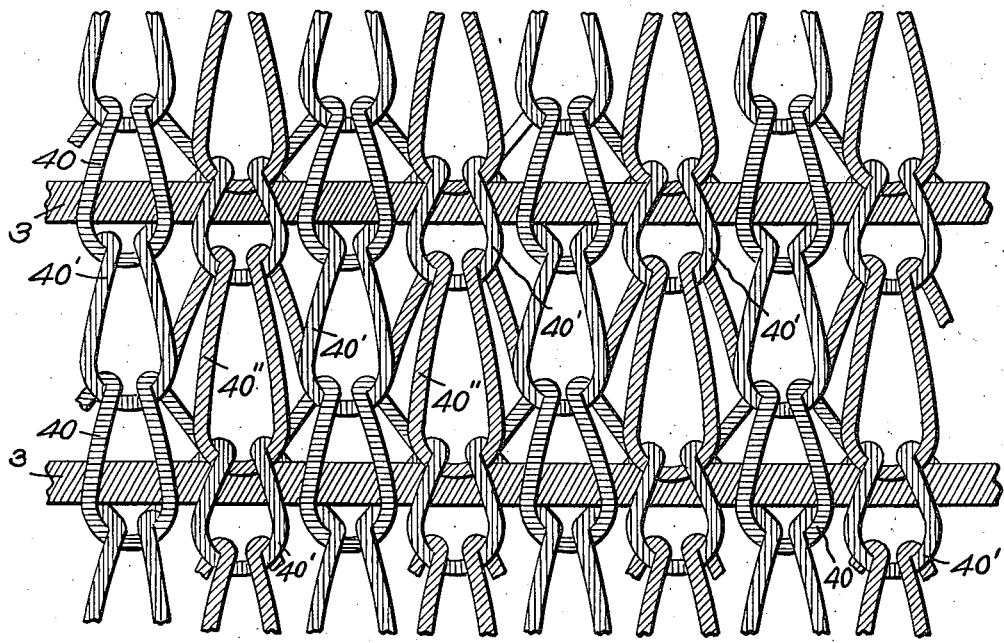
Fig. 27.
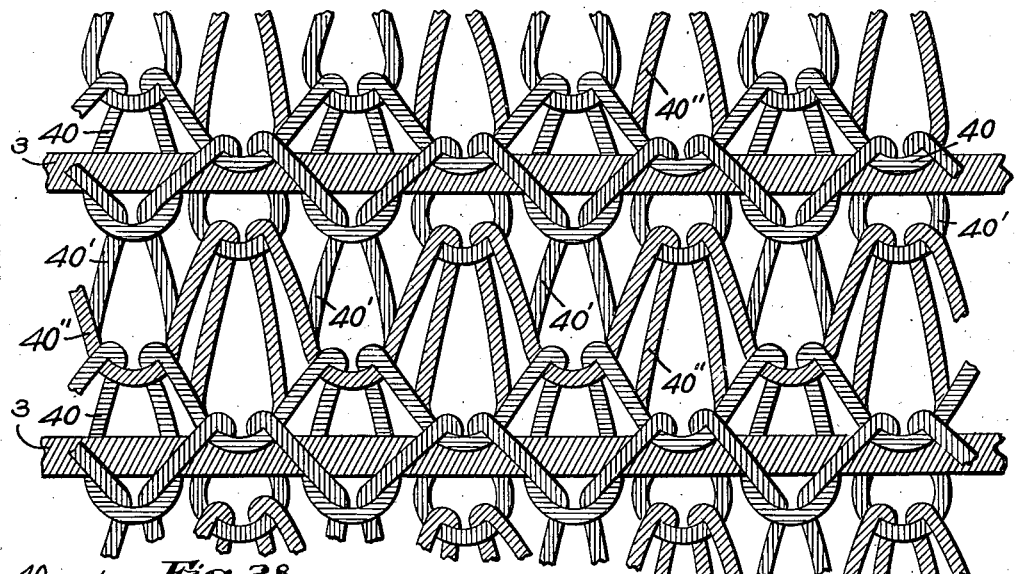
Fig. 28.
— YARN 1ST. FEED.
— YARN 2ND. FEED.
— YARN 3RD. FEED.
Inventor:
Charles E. Drumheller March 3, 1936. C. E. DRUMHELLER 2,033,095
MECHANISM FOR AND METHOD OF MAKING EXPANSIBLE PLAIN
KNITTED FABRIC CONTAINING RUBBER-LIKE STRANDS
Filed Jan. 19, 1934 10 Sheets-Sheet 10
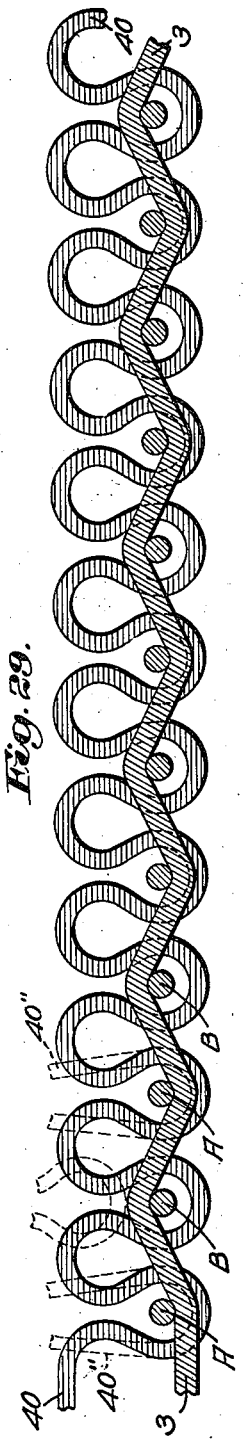
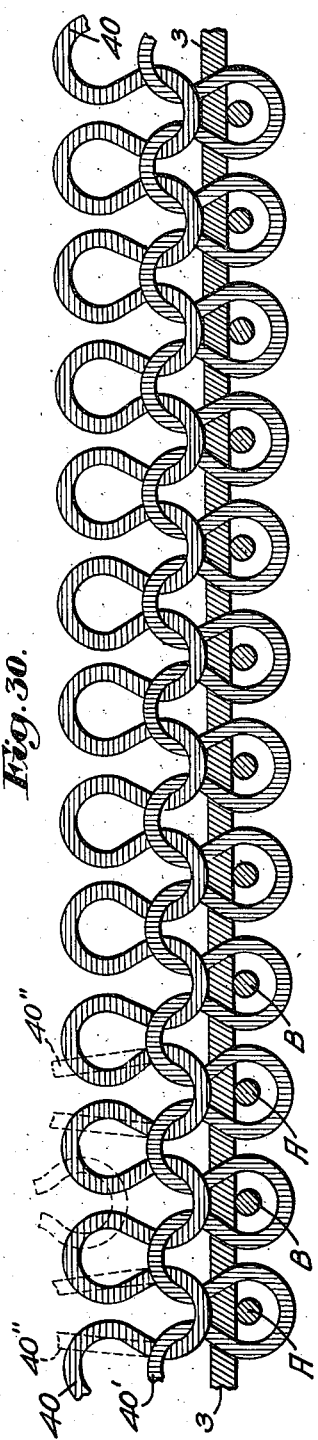
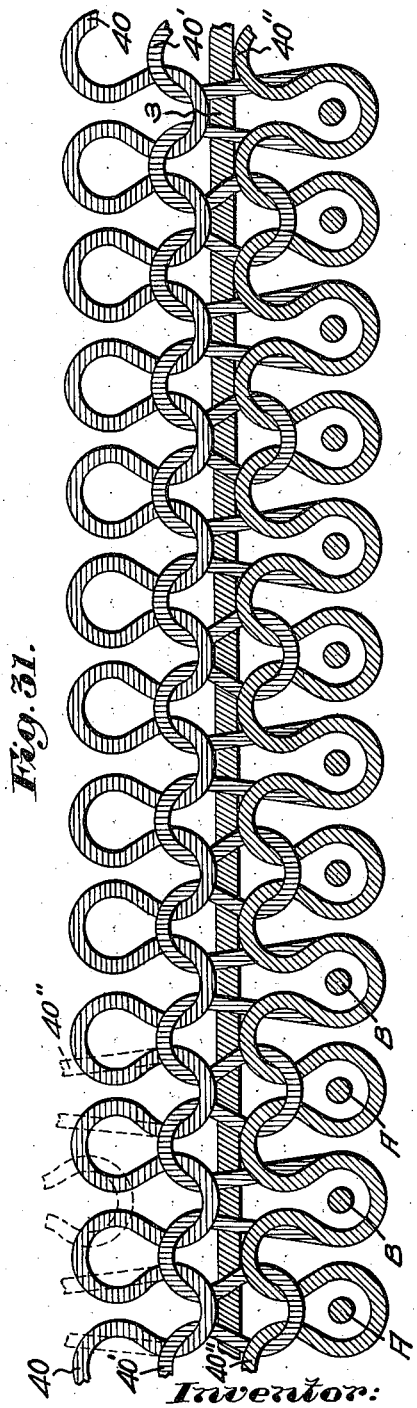
Inventor:
Charles E. Drumheller Patented Mar. 3, 1936

2,033,095

UNITED STATES PATENT OFFICE 2,033,095

MECHANISM FOR AND METHOD OF MAKING EXPANSIBLE PLAIN KNITTED FABRIC CONTAINING RUBBER-LIKE STRANDS

Charles E. Drumheller, Springfield, Mass., assignor to The William Carter Company, Needham Heights, Mass., a corporation of Massachusetts Application January 19, 1934, Serial No. 707,261

14 Claims. (Cl. 66—12)

This invention relates to mechanism for and to the related method of making expansible plain knitted fabric containing rubber-like strands.

In order that the principle of the invention may be readily understood, I have disclosed in the accompanying drawings one form of mechanism of my invention, upon or by which my method may be practiced and by which a novel fabric may be made, said fabric being claimed in my co-pending application Ser. No. 707,262½.

In said drawings,—

Fig. 2 is a vertical section taken through the machine at substantially the feed No. I, on the line 2—2 of Fig. 1;

Fig. 3 is an elevation looking outwardly from the inside of Fig. 2;

Fig. 8 is a view partly in horizontal section and partly in plan at feed No. I, it showing the sinker operating cams which are identical at all three feeds;

Fig. 9 is a vertical section showing the action of the presser cam at the first feed in the act of pressing the beards of the B needles;

Fig. 10 is a similar view showing the action of the presser cam at the second feed, there pressing the A and B needles;

Fig. 11 is a similar view showing the action of the presser cam at the third feed, it there pressing the A needles;

Fig. 12 is a side elevation showing the two types of pressers used respectively for the A and B needles;

Figure 15:
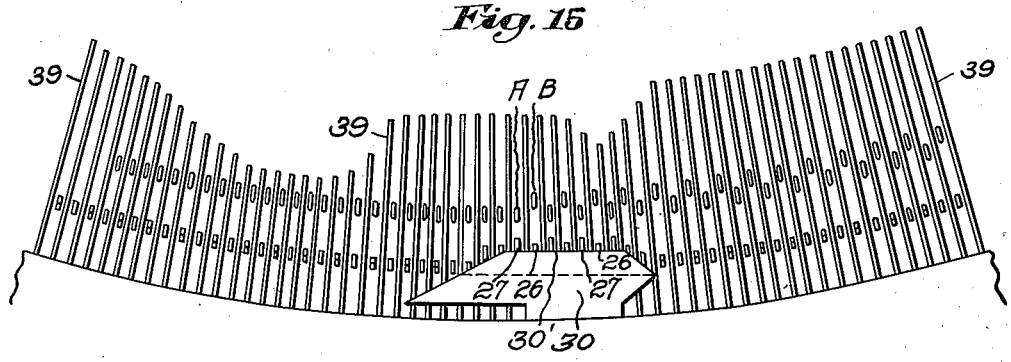
Figure 14:
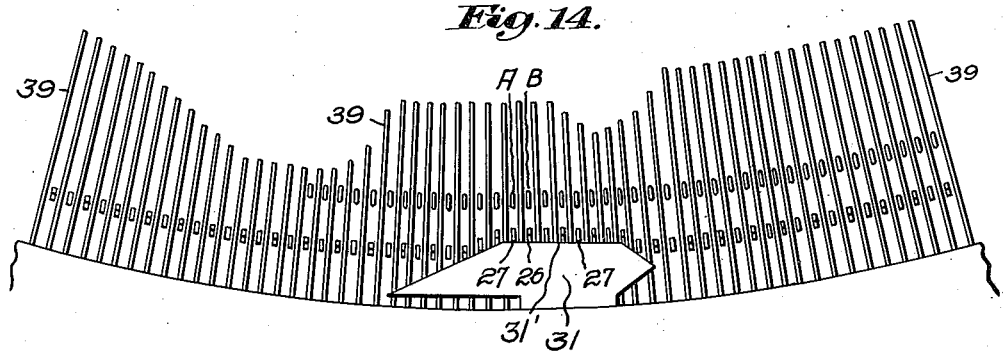
Figure 13:
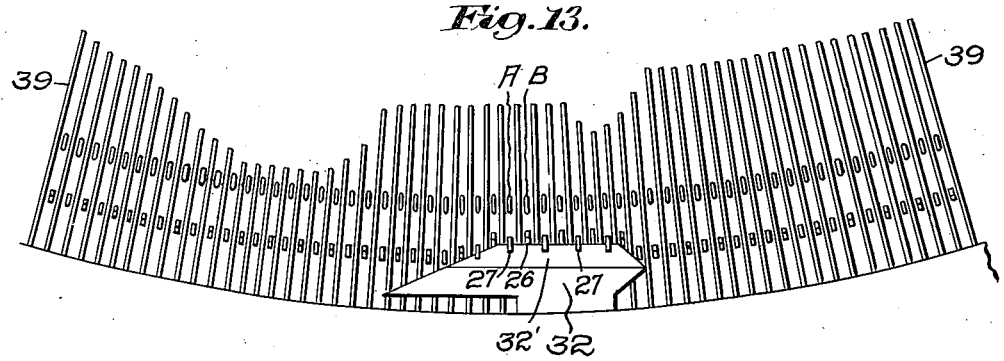
Figure 24:
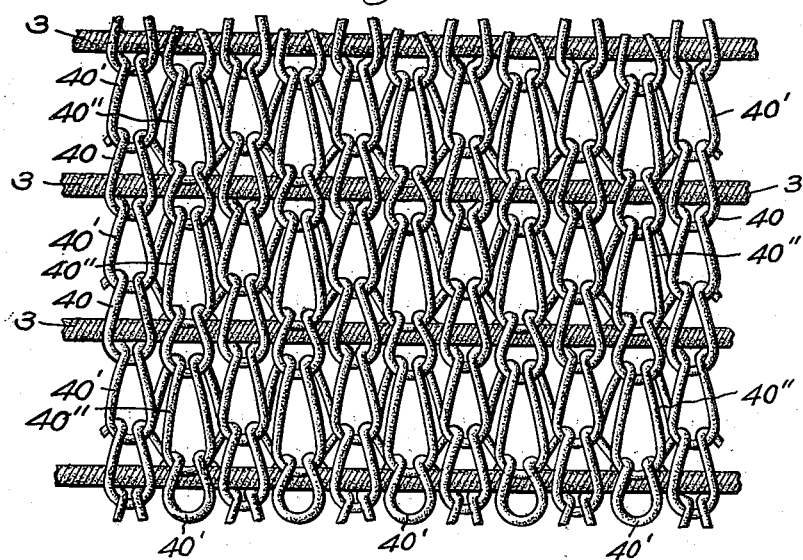
Figure 25:
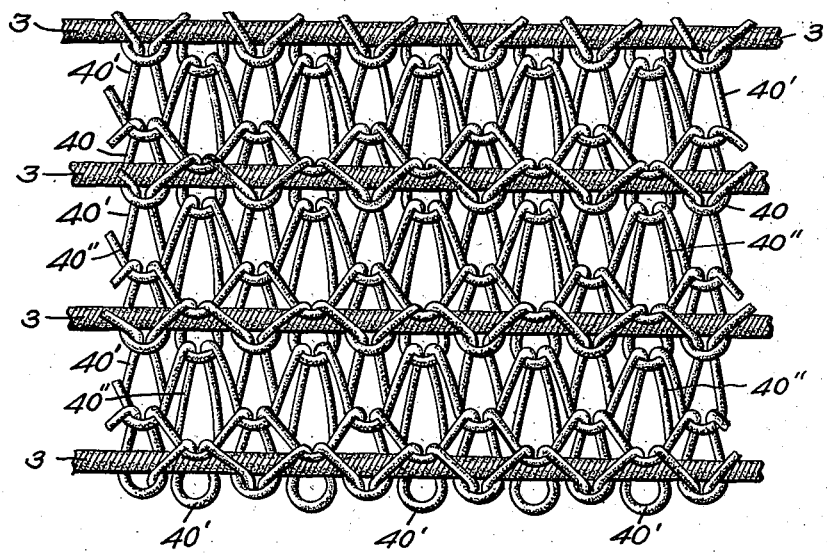

Figs. 13, 14, and 15 are plan views at the first, second and third feeds respectively to show the presser cams thereat, said views also showing the pressers, sinkers and needles;

Fig. 16 is a plan view of the yarn or thread guide bracket at the first feed and the closely related parts;

Fig. 17 is an outside elevation of the yarn or thread guide bracket and its support of Fig. 16;

Fig. 18 is an inside elevation but otherwise similar to Fig. 17;

Fig. 19 is a vertical section on the line 19—19 of Fig. 16;

Fig. 20 is an enlarged detail in elevation to show a sinker and the relation thereto of the usual knitting thread or yarn and the rubber-like strand;

Fig. 21 is a front elevation of means for controlling the tension of the rubber-like strand;

Fig. 22 is an end elevation partly in vertical section of the mechanism shown in Fig. 21;

Fig. 23 is a view partly in elevation and partly in vertical section of the mechanism shown in Fig. 22;

Fig. 24 is an inside view of a completed portion of the fabric, much enlarged (namely, a view of the fabric after it has passed the first, second and third feeds);

Fig. 25 is an outside view of the same fabric;

Figs. 26 and 27 are views corresponding to Figs. 24 and 25 respectively, but enlarged thereover, and wherein the yarn or thread at each of the first, second and third feeds and the rubber-like strand are contrastingly designated or hatched;

Fig. 28 is a chart indicating the contrasting of the yarns or threads at the first, second and third feeds; and Figs. 29, 30, and 31 are somewhat diagrammatic representations of the yarns or threads and the rubber-like strand at the first, the second and the third feeds respectively.

The machine of my invention is intended to knit a plain fabric as contrasted with a rib fabric. By "plain" fabric, I mean one knitted by a single series or set of needles. While said fabric may be knitted either as a straight or as a tubular fabric, I prefer to knit the same as a tubular or circular fabric and preferably upon a machine having spring beard needles, though my invention is not restricted thereto. While the machine may be of various types, I have chosen to represent the same as of the general Wildman type, wherein only cylinder needles are provided, said needles being mounted in a rotary needle cylinder for independent reciprocation at each of a plurality of feeds (herein three in number) as more fully hereinafter set forth.

In my co-pending application Ser. No. 707,259, I have disclosed generally similar mechanism for making a fabric of the same general type, but which machine employs four feeds (or a multiple thereof) and makes a fabric which is more highly expansible in a lengthwise direction than the fabric herein disclosed, for reasons which will fully appear upon a comparison of the two machines.

It has heretofore been proposed to introduce a rubber-like strand into knitted fabrics but heretofore so far as I am aware, this has mainly been accomplished by laying a strip or strand of rubber or a strand of rubber-like material between the needles of a rib knitting machine. It has also been attempted to introduce strands of rubber or rubber-like material to the needles of a circular machine not provided with a dial, but so far as I am aware without commercial success.

An important purpose of my invention is to introduce a rubber-like strand into a plain knitted fabric so that the same is incorporated thereinto at all the stitches of the fabric and does not not lie loosely upon the surface of the fabric anywhere. While my invention is not restricted to the introduction of any particular rubber-like strand, I have obtained the best results by employing a rubber-like strand known commercially as "Lastex", and which consists of a core of unvulcanized material, such, for example, as rubber juice suitably coagulated in water and then-wrapped with a very fine covering of silk or other suitable material, the composite strand being of very fine diameter and which I feed in the manner hereinafter described, to spring beard needles of a circular knitting machine.

While my invention is not restricted to any particular type of knitting machine, nor to the use of spring beard needles, I will describe as one example of my invention a circular knitting machine of the general Wildman type, but modified in accordance with my invention to enable the machine to receive the rubber-like strand and to knit the same into the fabric in such a manner as to incorporate it in the very substance of the fabric, so that it does not lie upon the surface anywhere and which renders the fabric expansible transversely and lengthwise.

An important feature of my invention is the varying of the stitch structure as, for example, by employing tuck stitches persistently and as herein shown in alternate courses on one group of the said two groups of needles and in the intervening courses on the other group of needles, so as to incorporate the rubber-like strand into the very substance of the plain knit fabric and in such a way that it does not lie upon the surface thereof anywhere. The said rubber-like strand is laid into the fabric in a straight condition and not in a corrugated or wavy condition as disclosed in my co-pending application, Ser. No. 707,259. The rubber-like strand is introduced at one of the feeds only of the machine, being the first feed of the three feeds of the machine, and in this respect is similar to the manner of introduction in the machine shown in my said co-pending application Ser. No. 707,259, wherein are employed four feeds, but with certain important differences hereinafter pointed out. Furthermore the rubber-like strand is under constant tension control, so that the article may be shaped as desired during the knitting operation, whereby the tubular fabric may be either of uniform diameter throughout or of a uniformly tapering character, or the fabric may be irregularly shaped with contrasted and enlarged zones wherever desired.

It will be understood that I use the term "tuck" stitches in a broad sense to include equivalent stitch variations.

I will first describe as far as may be necessary the general structure of the machine and then point out the novel features thereof.

Figure 1:
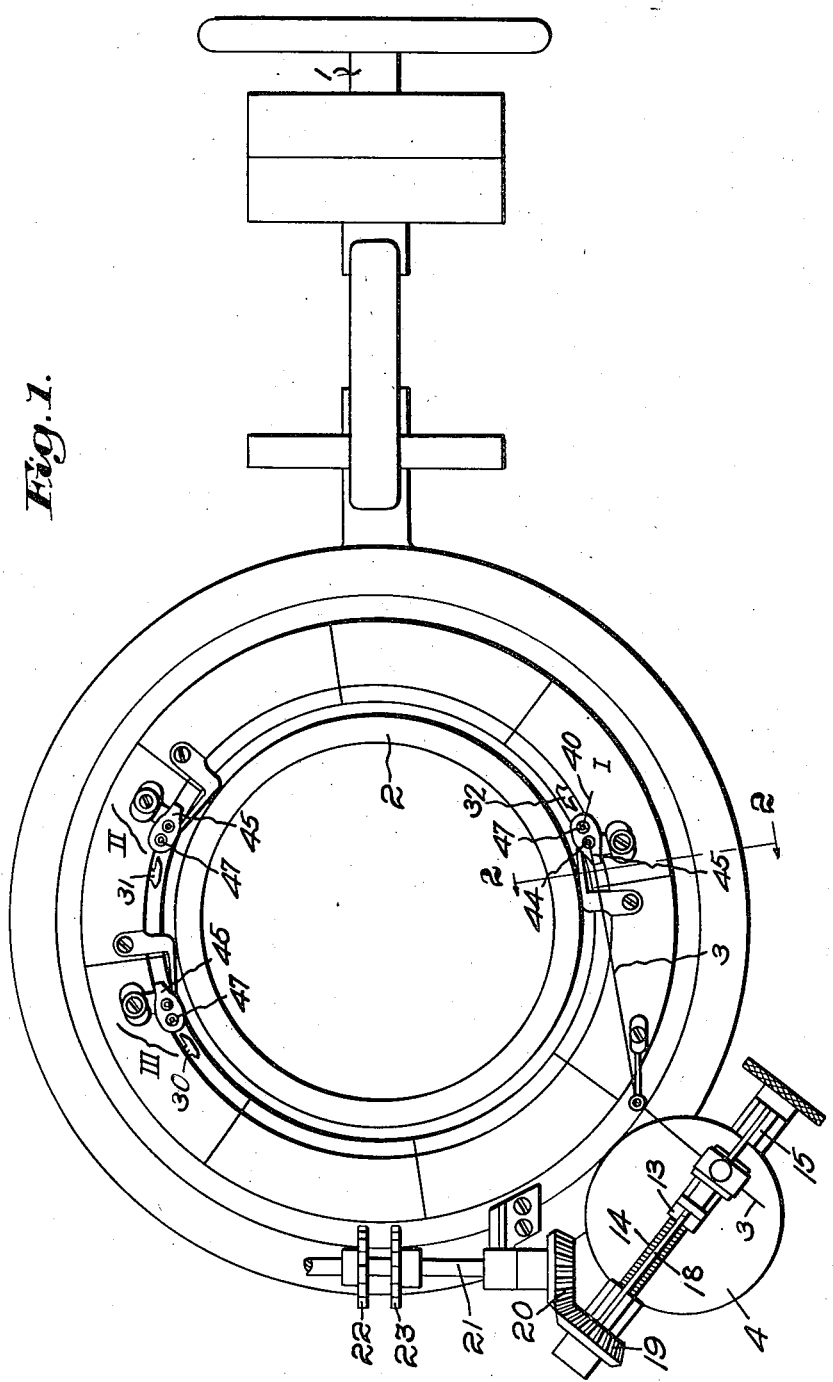
Fig. 1 is a top plan view of a circular knitting machine whereon the fabric of my invention may be produced.
Figure 5:
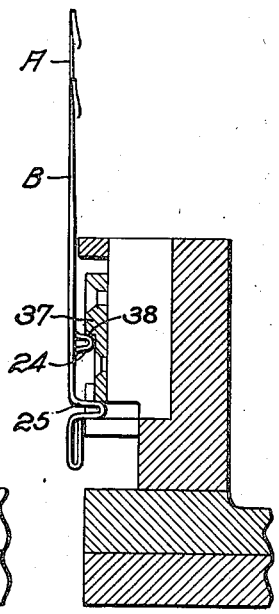
Fig. 5 is a vertical section on the line 5—5 of Fig. 4.
Figure 6:
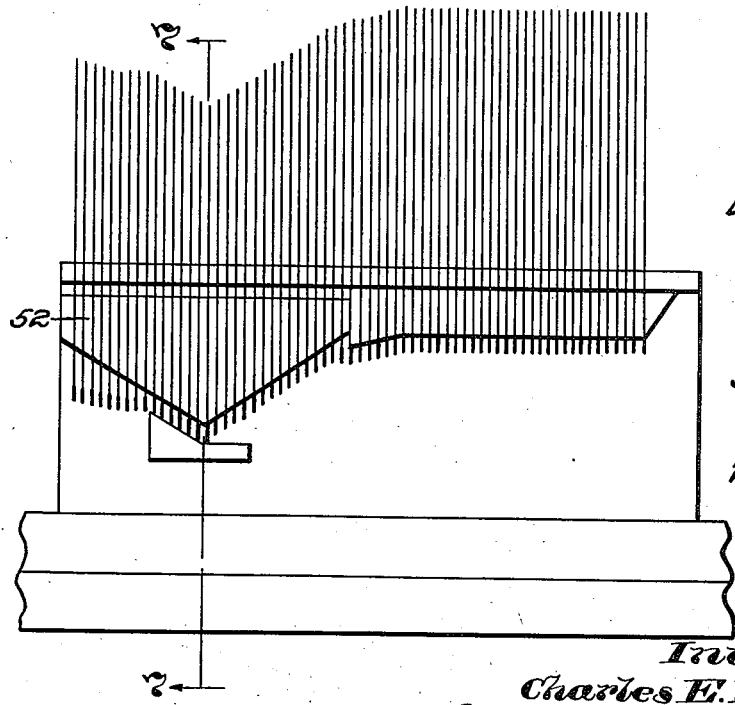
Fig. 6 is a view similar to Fig. 4, but taken at either the second or the third feed.

Referring first to Fig. 1, and Figs. 21, 22, 23, the main drive shaft of the machine is indicated at 1 in Fig. 1. By means of suitable gearing a movement of constant rotation is imparted to the needle cylinder 2, shown in section in Figs. 2, 5, and 6, said cylinder having spring beard needles shown in numerous figures of the drawings. I provide three feeds and have indicated the same in plan view in Fig. 1 as I, II, III. The structure at each of said feeds will be hereinafter described. The fabric may be of a uniform diameter in tubular form, or it may be of a constantly increasing or decreasing diameter or it may be a tubular fabric having a varied shape at different parts thereof, effected by the tension control upon the rubber-like strand. I have, in Fig. 1, represented said strand generally at 3, and as shown in that figure as well as in Figs. 21, 22, 23, the said rubber-like strand passes through a tension controller having a horizontally positioned constantly driven disk 4 contacting with which is a roller 5. The rubber-like strand 3 is fed between said disk and roller, and in order to vary the rate of feeding the said rubber-like strand 3 and therefore the tension thereof, the said roller 5 is moved automatically toward and from the axis of rotation of the said disk 4. While this may be accomplished in any suitable manner, I have in said figures represented the disk 4 as constantly rotated from the cylinder gear 6 upon the needle cylinder meshing with a beveled pinion 7 on a stud shaft 8 having a beveled pinion 9 meshing with a beveled pinion 10 on a short upright shaft 11 whereon said disk 4 is fast. The said roller 5 is suitably mounted in a member or standard 12 provided with a nut 13 adapted to travel to and fro along a screw 14 mounted in a suitable U-shaped bracket 15 which is secured by bolts 16 to the framing 17 of the machine. The standard 12 is guided by a bar 18 shown most clearly in Fig. 21. The screw 14 has fast thereon a beveled pinion 19 meshing with and driven by a beveled pinion 20, shown in Fig. 1 as fast on the short horizontal shaft 21 provided with a push ratchet 22 and a pull ratchet 23, which are respectively pushed and pulled by pawls (not shown) controlled by any suitable pattern mechanism. In this or in any other suitable manner, the rubber-like strand 3 is constantly fed under tension control, and said tension is varied at any and all times desired throughout the knitting operation.

Figure 7:
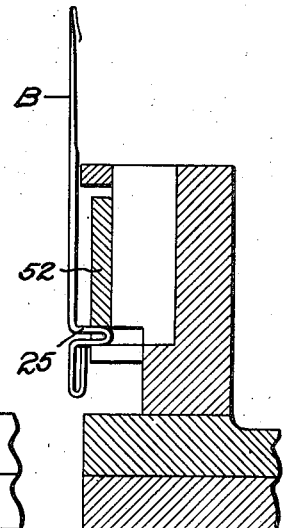
Fig. 7 is a vertical section on the line 7—7 of Fig. 6.

In the particular example of knitting mechanism selected for illustration of means for carrying out my method and producing my novel fabric (which latter is claimed in my co-pending application Ser. No. 707,262½) but to which my invention is not limited, I preferably, as stated, employ spring beard needles of which alternate needles have short butts 24 (see Fig. 5) and the intervening needles have long butts 25, as shown for example in Figs. 2, 5, and 7.

Individual pressers are provided for the needles and they are preferably of the character shown in Fig. 12 at 26, 27 respectively. The needles having the short butts 24, I term the A needles, and the needles having the long butts 25 I term the B needles. The individual pressers 26, therefore act upon the long butt needles B and the individual pressers 27 therefore act upon the short butt needles A to close the beards thereof at the proper time, as indicated in the various figures of the drawings. The pressers 26 are termed top cut pressers because of the recess formation 28 at the extreme upper edge thereof, and the pressers 27 are termed bottom cut pressers because of the recessed formation 29 slightly spaced from the extreme top of the said pressers, thereby permitting the bottom cut pressers to be acted upon at their extreme upper edge, as shown in Fig. 9 and elsewhere, and as will be more fully hereinafter described. The said pressers 26, 27 are of standard construction, and in this embodiment of the mechanism of my invention they alternate throughout the machine.

Fixed, so-called main presser cams are employed at the respective feeds to act upon the said pressers 26, 27 respectively, the said presser cams being shown at 32, 31, 30 in plan in Figs. 13, 14, 15 respectively, and in vertical section in Figs. 9, 10, 11 respectively. As shown most clearly in Fig. 11 which is the third feed, the presser cam 30 is shaped at its top edge 30', so that it acts only on the pressers 27 which press the beards of the A needles only. As shown in Fig. 10, the presser 31 is not cut away at its front edge 31', with the result that it acts upon both types of pressers 26 and 27, and therefore presses the beards of both the A needles and the B needles so that they cast off their loops. As clearly shown in Fig. 9 which is the first feed, the presser cam 32 is recessed at its front edge at 32', so as not to act upon the pressers 27, but to act upon the pressers 26, thereby to press the beards of the B needles only. Thus, at feed No. I the A needles hold their loops, at feed No. II both the A and the B needles cast off their loops, and at feed No. III the B needles hold their loops and the A needles cast off their loops.

Figure 4:
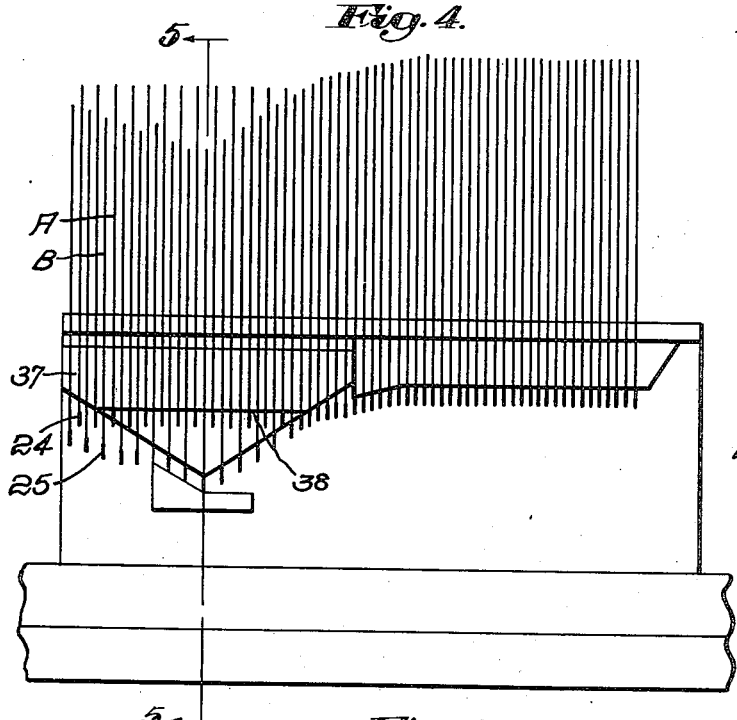
Fig. 4 is a front elevation looking in at feed No. I.

It has heretofore been stated that there are three feeds I, II, III. It is only at feed No. I that the rubber-like strand is introduced. It would be impossible in a machine of the standard Wildman constrcution, or any other machine of standard construction known to me, to introduce a rubber-like strand without change in the structure of the cooperating parts. In order to permit the desired introduction I have employed a stitch or pull-down cam 37, shown most clearly in Figs. 3, 4, and 5, and have recessed or milled away the inner face of the said cam 37 about one eighth of an inch in depth below the top thereof, as indicated at 38, so that the said cam will not drop down the A needles but will permit them to remain substantially elevated as they move across the face of the cam 37, as indicated most clearly in Figs. 3. and 4.

The sinkers employed by me, as disclosed in my said co-pending application 707,259 are represented at 39. The usual knitting yarn or thread, which may be of silk or other suitable material, as, for example, cotton or rayon, is represented at 40 in the several machine figures, and it will be noted that the said thread 40 at the said feed No. I is received at the proper time in the upper notch 41 of each sinker 39. The usual lower notch of the standard sinker would not be of sufficient size to receive and effect the proper manipulation of the rubber-like strand 3, and therefore I cut away or enlarge the said lower notch as indicated at 42. I also cut down the upper end of the sinker as indicated at 43. At the said first feed the rubber-like strand 3 is led through an eye 44 clearly shown in Figs. 16, 17, and 18, of a guide 45 and then is led into a recess or slot 46 positioned substantially at or very slightly above the top of the enlarged lower notch 42 of the said sinker 39. At the said first feed the regular knitting yarn or thread 40 of any desired character is introduced through an eye 47 of the guide 45, and then through a lower guide eye 48 positioned as shown most clearly in Figs. 19 and 20, so that the said regular knitting thread is directly received in the upper notch 41 of each sinker.

At the said first feed where the usual knitting thread 40 and the rubber-like strand 3 are both introduced, every other needle remains elevated; that is to say, the A needles remain elevated and the B needles are drawn down in customary manner. In other words, the short butt needles remain elevated and the long butt needles are drawn down. The regular knitting thread 40 is therefore engaged only by the beards of the B needles, said thread being taken at about the usual point in the descent of the said B needles. The sinkers are moved outwardly by their cams which are shown in cross section in Fig. 8 at 49. It will be observed that the said sinkers are advanced slightly at the cam portion 50 and again at the cam portion 51 of the said cam structure 49. The shape of the cams is such that after a stitch has been formed, the sinkers are pulled back and release the stitch from their throats as the needles pull down, so that the stitches on the needles may be properly cast off. The said sinker cam structure is the same at the second and third feeds, the presser cams only differing.

Still referring to the first feed, it will be understood that the beard of each needle B as it is descending is closed before the point of the beard reaches the rubber-like strand 3 that is in the throat of the sinker. The stitch of the silk thread 40 is later cast off, namely, at feed No. II without the said rubber-like strand 3 being knitted into the loops or stitches of the said silk thread 40. The sinkers, however, indent, kink or corrugate both the said threads at all the needles, and thereby very exactly measure the loops that are to be formed, as will be evident from an inspection of Fig. 29.

I will next refer to the structure at feed No. II shown in plan in Fig. 1. At said feed No. II, which desirably has the same equipment of thread guides as feed No. I, but at which no rubber-like strand is introduced, all the needles (namely, needles A and needles B) are drawn down together because the draw-down or stitch cam 52 (see Fig. 6) is not recessed, as is the drawdown cam 37 at feed No. I. No rotatable pattern wheel is employed at feed No. II as in my co-pending application Ser. No. 707,259. As stated, all the A and B needles are drawn down together at the second feed and therefore all knit. It is to be understood that in the disclosed type of machine upon which the fabric herein disclosed is knitted, the stitches formed or partly formed at the first feed are cast off at the second feed; those formed or partly formed at the second feed are cast off at the third feed; and those formed or partly formed at the third feed are cast off at the first feed. As already stated, at the first feed all the B needles have taken a loop of the usual knitting thread 40 into their beards. A rubber-like strand 3 is not received in the beards of the said B needles, but lies at the back or shank side of the said needles. Neither the regular knitting thread 40 nor the rubber-like strand 3 is taken into the hooks of the A needles at the first feed, but both said threads 40 and said strand 3 are bent, kinked or corrugated about the stems or shanks of said needles below their beards, whereby the proper length of the stitches is measured.

At the second feed, both the A and the B needles are pressed off, because all the needles are drawn down at the second feed, the draw-down cam not being recessed as at the first feed. It will be understood from the foregoing description that the rubber-like strand 3 at the first feed lies outside of all the A needles (namely, at the side of said needles next the observer), as clearly shown in the diagram Fig. 29, and that the said rubber-like strand 3 lies at the back of all the B needles at the said first feed, as shown in said diagram, Fig. 29.

At feed No. III the construction of parts is the same as at feed No. II. At the second feed the beards of both the A and the B needles are pressed, and at the third feed only the A needles are pressed.

While I have specifically referred to three feeds, I may employ any multiple thereof, as, for example, six feeds, in which case a rubber-like strand would be introduced at the first and fourth feeds.

I have in Figs. 24 and 27 illustrated the fabric which is formed in the manner hereinbefore described. It will be understood that the fabric shown in Figs. 26 and 27 is the same as that shown in Figs. 24 and 25 but enlarged and with a differentiated hatching for the three yarns or threads of silk or other non-rubber material, and the rubber-like strands 3, which hatching could not be employed in Figs. 24 and 25 without confusion.

Before referring to said figures for a description of the fabric, I will refer to the diagrammatic Figures 29, 30, 31, which will make clear the position of the usual knitting thread 40 and the rubber-like strand 3 at each of the said three feeds.

Referring first to Fig. 29, the silk or usual knitting thread is represented at 40 and the rubber-like strand at 3, and the hatching herein employed is the same as that used in Figs. 26 and 27. In said diagram Fig. 29 are represented twelve consecutive needles beginning at the left with an A needle, followed by a B needle, etc. It will be understood, of course, that there is only a single rubber-like strand 3 introduced in a total of three feeds, whereas there are three silk threads 40 introduced in a total of said three feeds. In Fig. 29, the hook side of the needle is toward the observer, and this is true of each of Figs. 30 and 31. In Fig. 29, which indicates what happened at the needles at feed No. I, it will be noted that the rubber-like strand 3 lies at the outside (that is, on the hook side) of all the A needles and at the back of the shanks of all the B needles, and that the said silk thread 40 is kinked or corrugated or bent into loop form at each of the needles. In dotted lines of Fig. 29 is shown a previous part of the structure of the fabric not necessary to refer to, and the same is true of each of Figs. 30 and 31. In each of Figs. 29, 30, and 31, I have designated the silk thread which is introduced at feed No. I as 40, and in Fig. 30 I have designated the silk thread introduced at feed No. II as 40', and in Fig. 31, I have designated the silk thread introduced at the third feed as 40'', similarly indicating the threads 40 and 40' in Fig. 31.

In the disclosure in my previous application Ser. No. 707,259 tuck stitches were formed at the A needles. In the operation of the machine shown in this application, tuck stitches are formed on all the A needles in every third course only, or in other words, on the first of each group of three courses, and tuck stitches are formed on the B needles in every third course only, being a course which is the second course following that in which tuck stitches are formed on the A needles. However, my invention is not limited to this particular arrangement. This effect is brought about by reason of the described arrangement of the individual pressers and the arrangement of the presser cams at the three feeds. Reference to Fig. 31 discloses the formation of tuck stitches at feed No. III on the B needles, and a reference to the dotted lines in Fig. 29 discloses the formation of tuck stitches on the A needles. The tuck stitch formation of the completed fabric is clearly illustrated in Figs. 24, 25, 26, 27.

The rubber-like strand 3 is not, as in my application Ser. No. 707,259, laid in a sinuous path, as clearly disclosed therein, but is laid in an entirely straight path constituting a spiral around the fabric. Owing to the persistent formation of stitch variations herein shown as tuck stitches, the rubber-like strand 3 is incorporated into the structure of the plain knitted fabric, so that the silk or like threads lie as to portions of their loops at both faces of the fabric and the rubber-like strand 3 does not anywhere lie at the outer face of the fabric, nor is it anywhere floated.

The appearance of the fabric is a plain fabric and is not in this embodiment thereof characterized by small openings, as in the fabric shown in my application Ser. No. 707,259.

Inasmuch as the rubber-like strand 3 is under tension at all times the fabric may be knitted either of uniform tubular diameter throughout or the shape may be varied as desired in the manner hereinbefore pointed out.

Having thus described the mechanism of my invention and the method practised thereby, it is to be understood that although specific terms are employed, they are used in a generic and descriptive sense and not for purposes of limitation, the scope of the invention being set forth in the following claims.

I claim:

1. Mechanism for knitting an elastic fabric containing a rubber-like strand or strands comprising in combination, a circular series of independent spring beard needles, a needle cylinder therefor, cam means to operate said needles, means to introduce at three points only, spaced about the needle circle, non-rubber threads, means to introduce a rubber-like strand at the first only of said feeds, and means to form stitch variations in each needle wale throughout the fabric in such relation to the introduction of said rubber-like strand that the latter is incorporated into the substance of the fabric by sinker wale portions of the stitches at said stitch variations.

2. Mechanism for knitting an elastic fabric containing a rubber-like strand or strands comprising in combination, a circular series of independent spring beard needles, a needle cylinder therefor, cam means to operate said needles and including means to divide the needles at said feed where the rubber-like strand is introduced, means to introduce at three points only, spaced about the needle circle, non-rubber threads, means to introduce a rubber-like strand at the first only of said feeds, and means to form tuck stitches in all the needle wales of the fabric in such relation to the rubber-like strand that the latter is incorporated into the fabric between needle wales lying at one side of said rubber-like strand and sinker wales lying at the other side thereof.

3. Mechanism for knitting an elastic fabric containing a rubber-like strand or strands comprising in combination, a circular series of independent spring beard needles, a needle cylinder therefor, cam means to operate said needles, means to introduce at three points only, spaced about the needle circle, non-rubber threads, means to introduce a rubber-like strand at the first only of said feeds, and means to form tuck stitches in each needle wale throughout the fabric in such relation to the introduction of the rubber-like strand that the latter is incorporated into the substance of the fabric between needle wales and sinker wales.

4. Mechanism for knitting an elastic fabric containing a rubber-like strand or strands comprising in combination, a circular series of independent spring beard needles, a needle cylinder therefor, cam means to operate said needles, means to introduce at three points only, spaced about the needle circle, non-rubber threads, means to introduce a rubber-like strand at the first only of said feeds, and including long and short butts in alternation upon said needles throughout the needle circle, and means to form stitch variations in each needle wale throughout the fabric and including differentiated individual pressers for the needles alternating throughout the needle circle.

5. Mechanism for knitting an elastic fabric containing a rubber-like strand or strands comprising in combination a circular series of independent spring beard needles, a needle cylinder therefor, cam means to operate said needles, means to introduce, at three points only, spaced about the needle circle, non-rubber threads, means to introduce a rubber-like strand at the first only of said feeds, and including long and short butts in alternation upon said needles throughout the needle circle, said cam means including a drawing down cam at the first of said feeding points to draw down only the long butt needles, and differentiated individual pressers in alternation throughout the needle circle.

6. Mechanism for knitting an elastic fabric containing a rubber-like strand or strands comprising in combination, a circular series of independent spring beard needles, a needle cylinder therefor, cam means to operate said needles, means to introduce at three points only, spaced about the needle circle, non-rubber threads, means to introduce a rubber-like strand at the first only of said feeds, means to form stitch variations in each needle wale throughout the fabric in such relation to the introduction of said rubber-like strand that the latter is incorporated into the substance of the fabric by sinker wale portions of the stitches at said stitch variations, and means to impart a continuing but variable tension on the rubber-like strand while being introduced, thereby to shape the fabric.

7. Mechanism for knitting an elastic fabric containing a rubber-like strand or strands comprising in combination, a circular series of independent spring beard needles, a needle cylinder therefor, cam means to operate said needles and including means to divide the needles at said feed where the rubber-like strand is introduced, means to introduce at three points only, spaced about the needle circle, non-rubber threads, means to introduce a rubber-like strand at the first only of said feeds, and means to form tuck stitches in all the needle wales of the fabric in such relation to the rubber-like strand that the latter is incorporated into the fabric between needle wales lying at one side of said rubber-like strand and sinker wales lying at the other side thereof, and means to impart a continuing but variable tension on the rubber-like strand while being introduced, thereby to shape the fabric.

8. Mechanism for knitting an elastic fabric containing a rubber-like strand or strands comprising in combination, a circular series of independent spring beard needles, a needle cylinder therefor, cam means to operate said needles, means to introduce at three points only, spaced about the needle circle, non-rubber threads, means to introduce a rubber-like strand at the first only of said feeds, means to form tuck stitches in each needle wale throughout the fabric in such relation to the introduction of the rubber-like strand that the latter is incorporated into the substance of the fabric between needle wales and sinker wales, and means to impart a continuing but variable tension on the rubber-like strand while being introduced, thereby to shape the fabric.

9. Mechanism for knitting an elastic fabric containing a rubber-like strand or strands comprising in combination, a circular series of independent spring beard needles, a needle cylinder therefor, cam means to operate said needles, means to introduce at three points only, spaced about the needle circle, non-rubber threads, means to introduce a rubber-like strand at the first only of said feeds, and including long and short butts in alternation upon said needles throughout the needle circle, means to form stitch variations in each needle wale throughout the fabric and including differentiated individual pressers for the needles alternating throughout the needle circle, and means to impart a continuing but variable tension on the rubber-like strand while being introduced, thereby to shape the fabric.

10. Mechanism for knitting an elastic fabric containing a rubber-like strand or strands comprising in combination, a circular series of independent spring beard needles, a needle cylinder therefor, cam means to operate said needles, means to introduce at three points only, spaced about the needle circle, non-rubber threads, means to introduce a rubber-like strand at the first only of said feeds, and including long and short butts in alternation upon said needles throughout the needle circle, said cam means including a drawing down cam at the first of said feeding points to draw down only the long butt needles, differentiated individual pressers in alternation throughout the needle circle, and means to impart a continuing but variable tension on the rubber-like strand while being introduced, thereby to shape the fabric.

11. That method of knitting an elastic fabric containing a rubber-like strand or strands which includes the following steps: introducing non-rubber knitting threads at three points spaced about a needle circle; introducing a rubber-like strand at the first of said points; dividing the needles where said rubber-like strand is introduced; and forming stitch variations in all the needle wales throughout the fabric in such relation to the introduction of said rubber-like strand that the latter is incorporated into the substance of the fabric by loop portions of said stitch variation.

12. That method of knitting an elastic fabric containing a rubber-like strand or strands which includes the following steps: introducing non-rubber knitting threads at three points spaced about a needle circle; introducing a rubber-like strand at the first of said points; dividing the needles where said rubber-like strand is introduced, and forming tuck stitches in all the needle wales of the fabric in such relation to the introduction of the rubber-like strand that the latter is incorporated into the substance of the fabric between needle wales at one side of said strand and sinker wales at the other side thereof.

13. That method of knitting an elastic fabric containing a rubber-like strand or strands which includes the following steps: introducing non-rubber knitting threads at three points spaced about a needle circle; introducing a rubber-like strand at the first of said points; dividing the needles where said rubber-like strand is introduced; and forming stitch variations in all the needle wales throughout the fabric in such relation to the introduction of said rubber-like strand that the latter is incorporated into the substance of the fabric by loop portions of said stitch variation, and shaping the fabric during the knitting operation by imparting a continuing but varying tension on the rubber-like strand.

14. That method of knitting an elastic fabric containing a rubber-like strand or strands which includes the following steps: introducing non-rubber knitting threads at three points spaced about a needle circle; introducing a rubber-like strand at the first of said points; dividing the needles where said rubber-like strand is introduced, and forming tuck stitches in all the needle wales of the fabric in such relation to the introduction of the rubber-like strand that the latter is incorporated into the substance of the fabric between needle wales at one side of said strand and sinker wales at the other side thereof, and shaping the fabric during the knitting operation by imparting a continuing but varying tension on the rubber-like strand.

CHARLES E. DRUMHELLER.